United States Patent [19]
Crowder

[11] 3,722,427
[45] Mar. 27, 1973

[54] PNEUMATIC TRANSIT SYSTEMS

[76] Inventor: Wyly Kenneth Crowder, 3255 Windcroft Drive, Pontiac, Mich. 48054

[22] Filed: May 24, 1971

[21] Appl. No.: 146,352

[52] U.S. Cl. ....................104/155, 104/88, 188/40
[51] Int. Cl. .............................................B61b 13/00
[58] Field of Search ......104/18, 23 FS, 134, 88, 155; 188/40

[56] References Cited

UNITED STATES PATENTS

| | | | |
|---|---|---|---|
| 381,401 | 4/1888 | Mayall | 104/134 |
| 3,552,321 | 1/1971 | Priebe | 104/18 |
| 3,583,324 | 6/1971 | Bertin | 104/23 FS |

*Primary Examiner*—Gerald M. Forlenza
*Assistant Examiner*—Frank E. Werner
*Attorney*—James T. Barr

[57] ABSTRACT

A pneumatic transit system for vehicles and material handling means in which the propulsion means is a linear air motor which operates by means of progressive air impulses. The air motor is controlled to provide space monitored accelleration and decelleration for passengers or materials. A structural tube along the travel path provides the two way guide and air duct with pressurized air expanded down through the linear air motor to silent ambient pressure. Each vehicle has a piston in an air tube to act as a cushion or shock absorber to prevent collision with adjacent vehicles.

10 Claims, 8 Drawing Figures

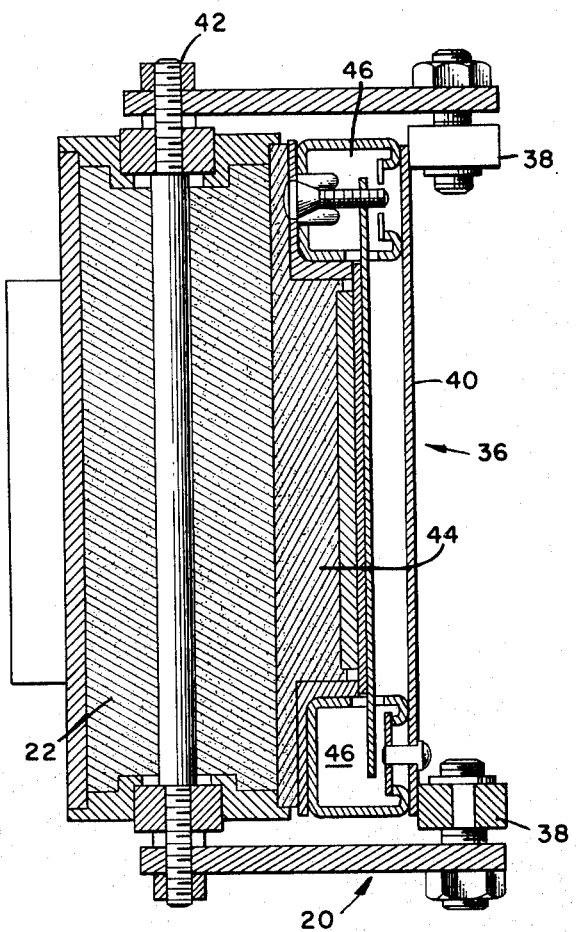
FIG.4
FIG.5
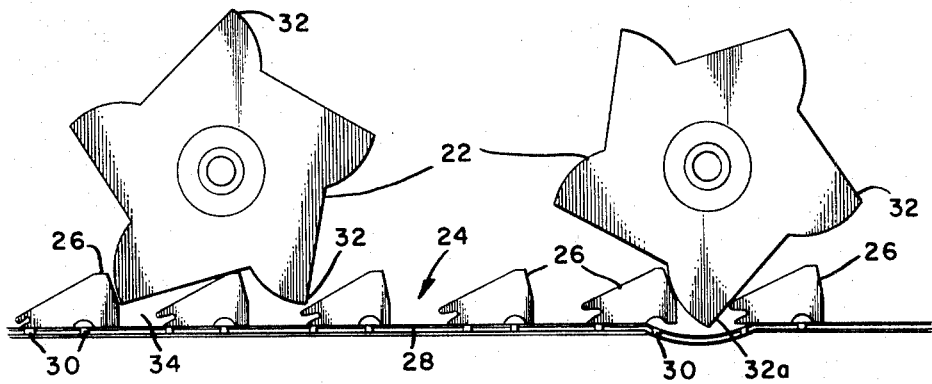

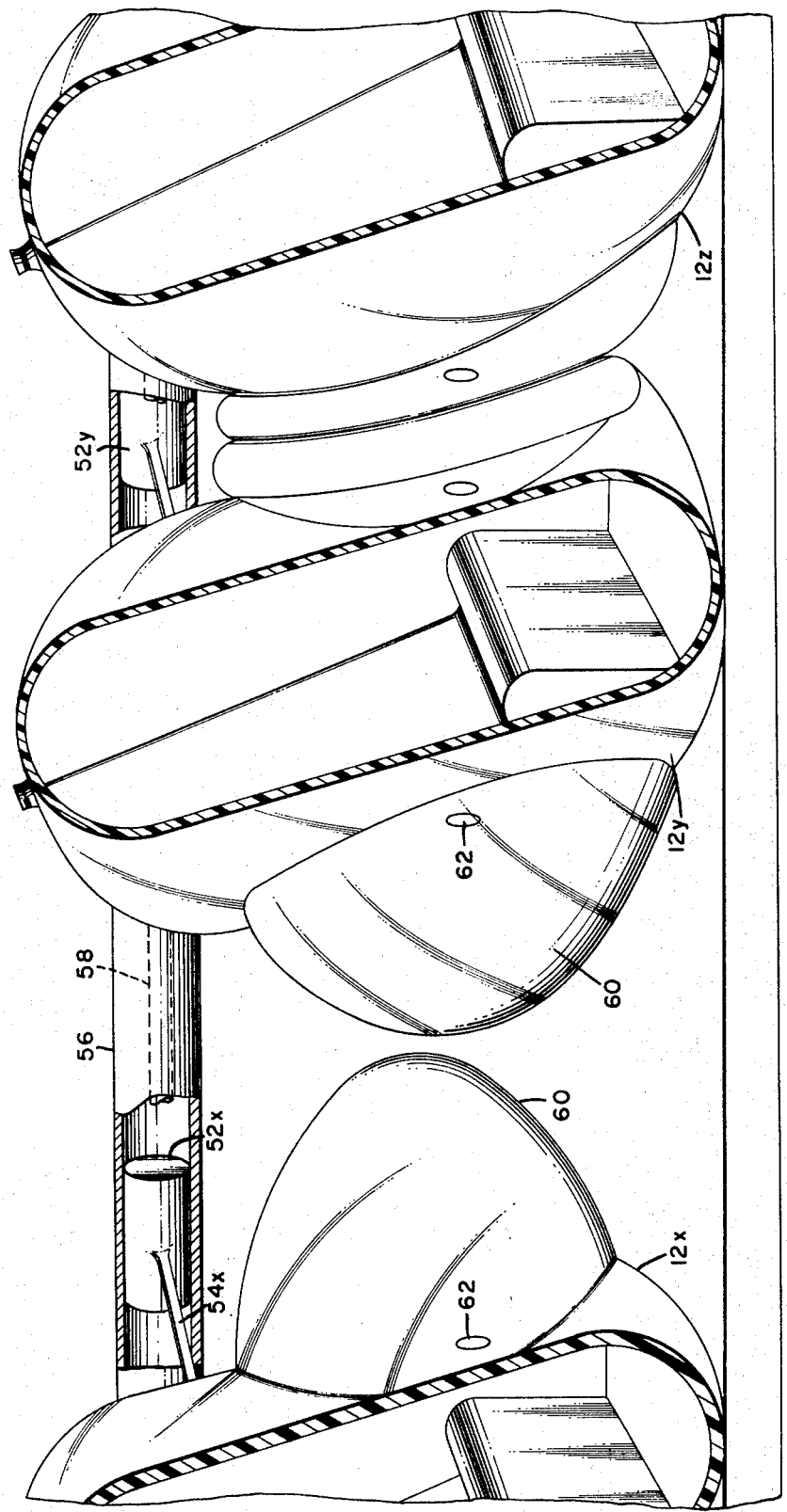

PNEUMATIC TRANSIT SYSTEMS

BACKGROUND OF THE INVENTION

This invention is primarily concerned with moving people and material in a safe, comfortable, convenient, economical and efficient manner to overcome the difficulties which are present in conventional transit systems.

It is obvious that man's survival depends upon his aptitude in dealing with time and space in the earth's environment especially when considering the population growth. It is equally obvious that present means for moving people into and in urban areas are not only inadequate but harmful to the environment such as the pollution mainly caused by internal combustion engines. Most urban transit systems are either unable to function economically but are impractical both from the standpoint of moving people but also due to the use of archaic and out of data equipment. This has contributed to the pollution problem as well as adding to the congestion with private vehicles. Therefore man's ecology requires that he use time and space efficiently, economically and comfortably in order to survive in this rapidly expanding (population-wise) world.

It is therefore, a primary object of this invention to provide a novel transit system which accomplishes a high degree of safety, comfort, convenience, economy, flexibility, privacy and non-pollution of the environment. This object is obtained by the use of a silent and efficient linear air motor which drives the vehicle or material carrier at selected speeds in a uniform system which avoids congestion and permits computerized control to obviate human error.

Another object of this invention is to provide a transit system utilizing individual vehicle concepts which enable a high degree of privacy and safety while moving people or material in great numbers from one place to another. It is also contemplated that this invention is not limited to horizontal travel but may be readily adapted to vertical as well as diagonal usage.

A further object of this invention is to provide an individually controlled driving means for each vehicle or carrier which obtains space monitored accelleration and decelleration thus reducing docking and merging to a smooth and non-conflicting glide. A unique queing and docking control generates the highest possible density in the loading and un-loading areas. The linear air motor, as used in this system, is also independent of municipal power supplies since no power failure can affect the operation. An independent stationary turbine is provided at 2 mile intervals, which are started and operated upon demand from a control station. This means that no space is required for heavy buss bars or large transformers. The linear air motor eliminates the necessity of having an air commutator from the track tube to each vehicle. The importance of this object is apparent when it is realized that a commutator is a high wear device with constant maintenance problems. The linear air motor also eliminates the necessity of having individual motors in each vehicle that is normally geared to the wheels or a non-slip tractive device to the tracks. In essence, the linear air motor is a gear-type air motor with the internal gear being built in a straight line or rack.

A still further object of this invention is to provide a collision prevention means to protect both occupants and materials carried by the vehicles when proximity engagement is likely, such as for merging, docking or possible mal-function of the apparatus. An auxiliary bumper-like buffer means is also provided as an extra safety precaution.

These and further objects will be more fully explained in the following description and the appended drawings, in which:

DRAWINGS

FIG. 4 is a sectional view of the linear air motor or power means.

FIG. 5 is a view showing the valving action of a portion of the pneumatic drive means.

FIG. 7 is a perspective view of portions of vehicles, partly in section, illustrating possible contact therebetween.

DESCRIPTION

Figure 1:
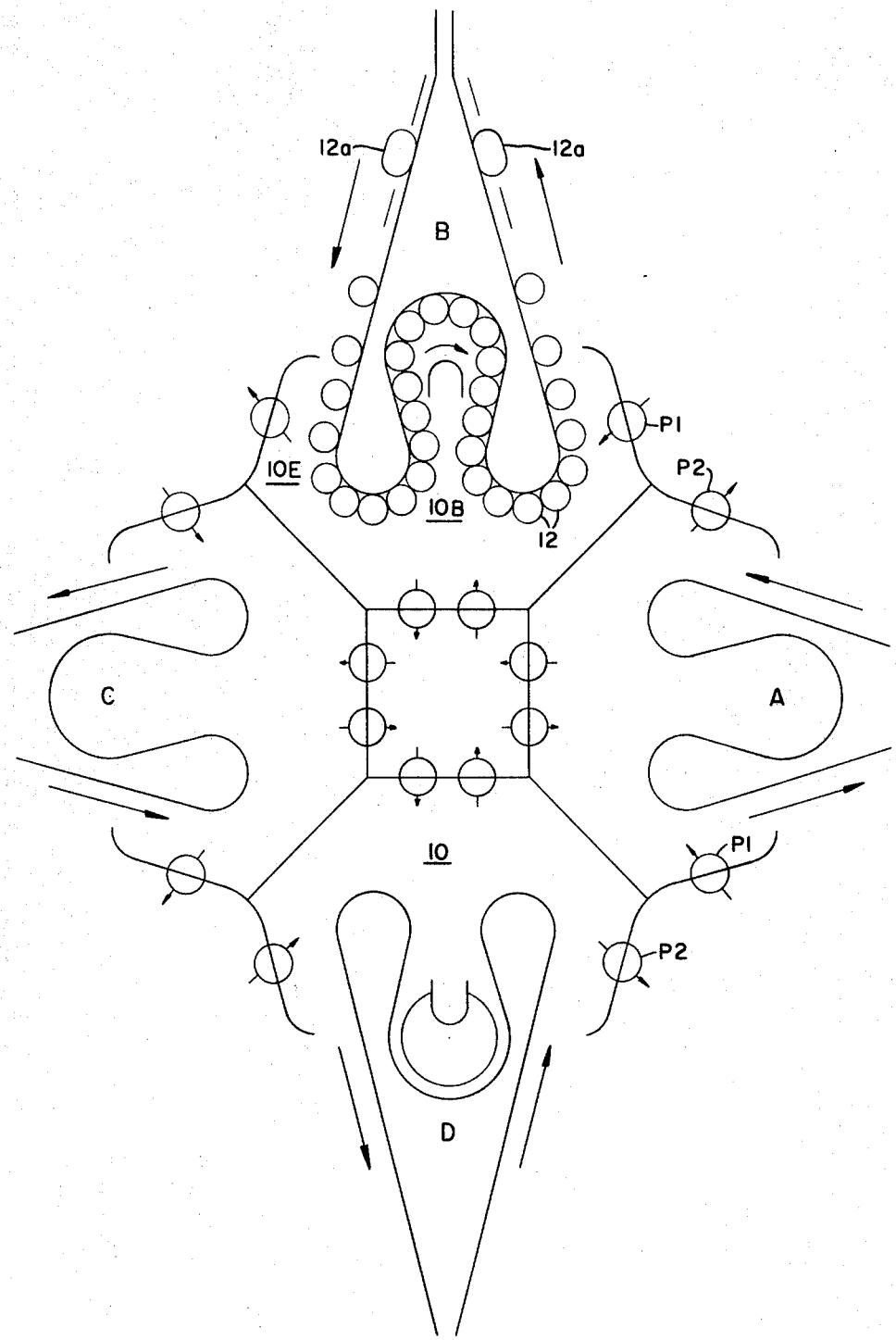
FIG. 1 is a representative plan view of a typical boarding station showing four terminals or loops merging therein.
Figure 2:
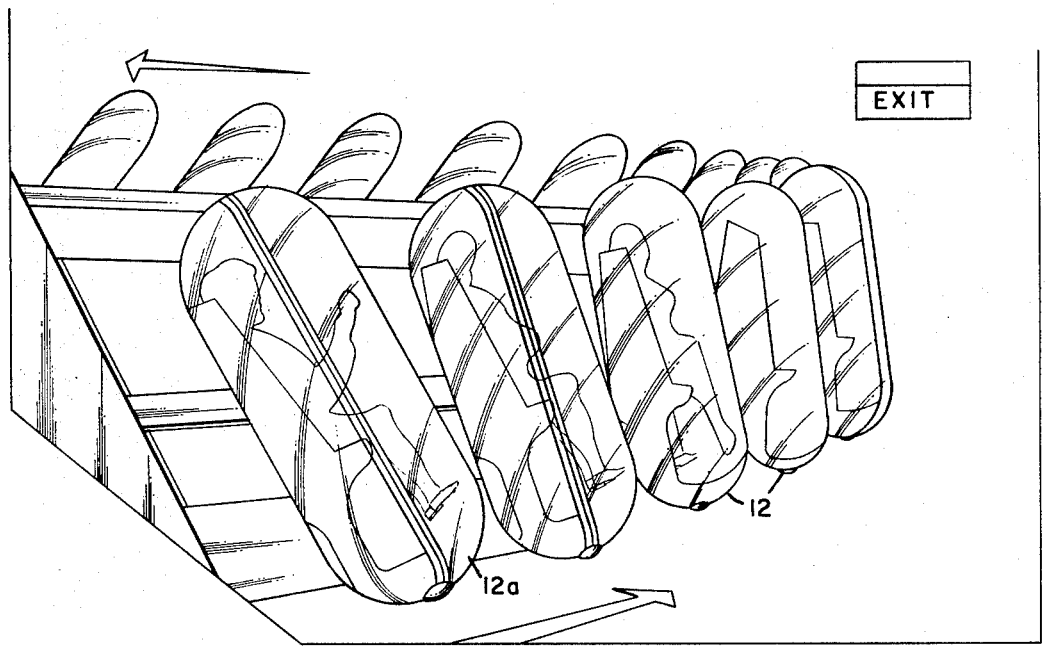
FIG. 2 is a perspective view of a portion of a boarding station showing vehicle cars with passengers.
Figure 3:
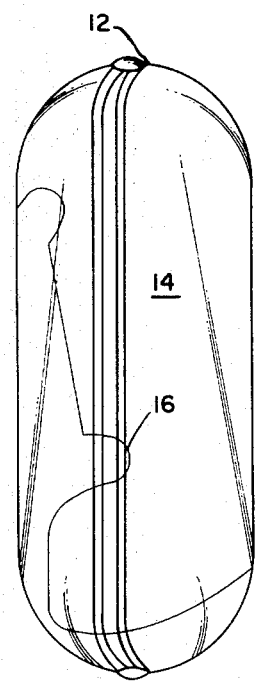
FIG. 3 is a front view of a vehicle car.

Referring now to FIGS. 1, 2 and 3 the boarding station and some of its components are shown. Generally indicated, the station 10 or loop interchange has the appearance of a subway or railway station which is accessible to pedestrian passengers, as well as vehicle passengers arriving on the travel loops A, B, C and D. The boarding areas or loop interchange 10 is designed to accomodate high or low density transit situations depending upon the local requirements such as airports, shopping centers, urban and rural traffic or when extendable to serve a major municipal area. Note, that it is important the loops be closed and relatively independent of each other, except for access at the station terminals. Because of this feature, the transit system is independent of switching and merging problems, while permitting speeds from 8 to 80 miles per hour, for example. It is also designed on the individual vehicle concept, which so obviously is the solution to present day problems of transportation in congested areas.

As shown in FIG. 3, a passenger for transit has access to a vehicle means or car 12 which is formed of transparent, shock absorbing plastic or similar material, such as polyurethane. A rotating sliding door 14 at the right front section permits ample room for the passenger to leave or board. A formed seat 16 in the car 12 is provided to accommodate the passenger in either an upright or reclining position. The vehicle, because of its unique design, gives the illusion of spaciousness and viewability without a feeling of crampness, although the preferred dimensions are realistically 69 inches in height, 26 inches wide and 34 inches long. In travel the cars will be inclined some 30 – 45° from the vertical to effect a reclining position which is both comfortable and less resistant to wind and friction. (note, the vehicle 12a in FIGS. 1 and 2.)

In FIG. 1, an arriving passenger P1, whether a pedestrian or one coming from a different loop, A, B, C, or D, proceeds to the center location of area 10 for access to the desired loop for the particular destination. Assuming passenger P1 has just arrived at the loop interchange 10 and desires a destination served by loop B, after proceeding to the center of the station, passenger P1 walks to the boarding area 10B, whereat arriving vehicles 12, which has been emptied at the embarking area generally indicated at 10E, permits selection by passenger P1 of an empty vehicle which he then boards at relatively slow speed or stopped position. It is contemplated that computer and destination control may be used with this invention, whereby the passenger selects the desired destination, pays the fare, and receives a punched card which may be inserted in a receptacle either at the station or in the vehicle to program the vehicle. A similar system is shown and described in the inventor's issued U.S. Pat. No. 3,403,634, which was granted in the United States on Oct. 1, 1968.

Similarly, passenger P2 arriving on one of the loops has ready access to either another loop or a destination within walking distance of this station 10. It should be noted that the other loop A, C and D are similar to loop B as described and that the number of loops at a particular station is a matter of choice, depending upon the particular requirements thereat.

Referring now to FIGS. 4 and 5, there is shown a power means or linear air motor 20 for driving the vehicles 12. An air rotor 22 attached to each vehicle 12 is pneumatically rotated by means of the air valving arrangement shown in FIG. 5. The gear rack 24 has a series of flexible gear teeth 26 arranged on a flexible sheet 28 having a series of air inlets discretely placed beneath the gear teeth 26. The air inlets 30 are connected with a source of air pressure of approximately 30 p.s.i., that is efficiently expanded down to silent ambient temperature pressure through the linear air motor.

Modern plastics have been developed that are capable of long wear and are flexible enough to air seal the teeth 26 against the flexible sheet 28. In operation, as a tooth 32a rotates clockwise it pushes minutely against the sheet 28, as shown on the right side of FIG. 5, permitting the inlets 30a to pressurize the cavity 34 beneath the rotor tooth 32a. The air pressure than exerts a rotational force on the rotor tooth 32a to drive the air rotor 22 in a clock-wise direction. As the rotor tooth 32a rolls forward, it withdraws and allows the flexible sheet 28 to close the air inlet 30a. Similarly the other rotor teeth 32 act in conjunction with the gear teeth 26 and sheet 28 to move the vehicles 12 in a linear direction.

As shown in FIG. 4, the linear air motor 20 has a supporting structure 36 which provides the guide matrix for the vehicle as well as an air duct to transmit the air pressure along the sheet 28. The vehicle (not shown) has a pair of rollers 38 which ride along the track support 40 under the propulsion power of the air rotor 22 rotating about the shaft 42. An air seal 44 covers the rotor compartment to prevent leakage from the air ducts 46.

A stationary air turbine is provided every 2 miles to supply air pressure thru the ducts 46 to drive the vehicles 12. Air compression in the ducts supply the power surge demands for the system. Because of the loop being a closed system, it is desirable to contain the two-way tracks in the same supporting structure, so as to permit travel in both directions by vehicles.

Figure 6:
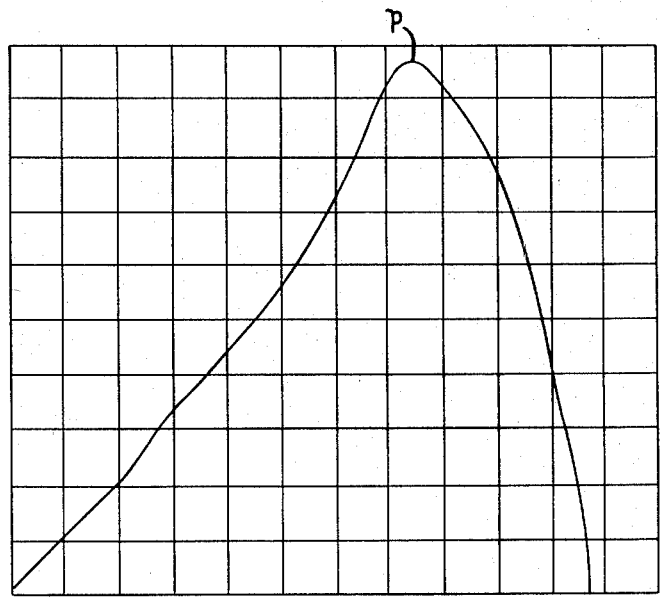
FIG. 6 is a graph of the thrust curve of a gear tooth for the linear air motor.

Referring now to FIG. 6, the thrust curve of a rotor tooth 22 illustrates the rapid rise in rotational force to point $p$ and then a faster decline upon expansion of the air and closure of the valving by the flexible sheet 28.

Referring now to FIG. 7, there is shown vehicles 12 $x$, 12 $y$ and 12 $z$ as they could appear due to mal-function or slippage in the system. The main shock-absorber 50 or cushion tube may be made integrally with the structure shown in FIG. 4, or separately as desired. Each vehicle is provided with a piston 52 secured to the vehicle by means of a connecting rod 54. For example, vehicle 12$x$ has piston 52 $x$ connected by rod 54$x$, etc. In operation, as the vehicle cars are travelling or when slowing down at a station terminal, speed differentials are compensated and bumping between vehicles is prevented by air pressure which is created by adjacent pistons 52 converging within the tube 56. Leakage, which might be caused by the rods 54, is prevented by means of a longitudinal seal 58 covering the slit in tube 56 along which the rod 54 traverses as the vehicles are moving. The seal 58 is made of a flexible, high memory plastic material which re-seats against the tube after the rod 54 has moved past any particular point.

As an auxiliary shock-absorber, there is provided on each vehicle 12, flexible bumpers or buffers 60 having therein a small aperture 62. The bumpers are exposed to atmospheric pressure but in case of contact between vehicles, when mal-function of cushion device 50 is evident, then the buffers 60 contract to absorb any shock between adjacent vehicles, while permitting the pressure to reduce gradually thru the apertures 62, upon release the buffer 60 will subsequently return to its original shape.

Figure 8:
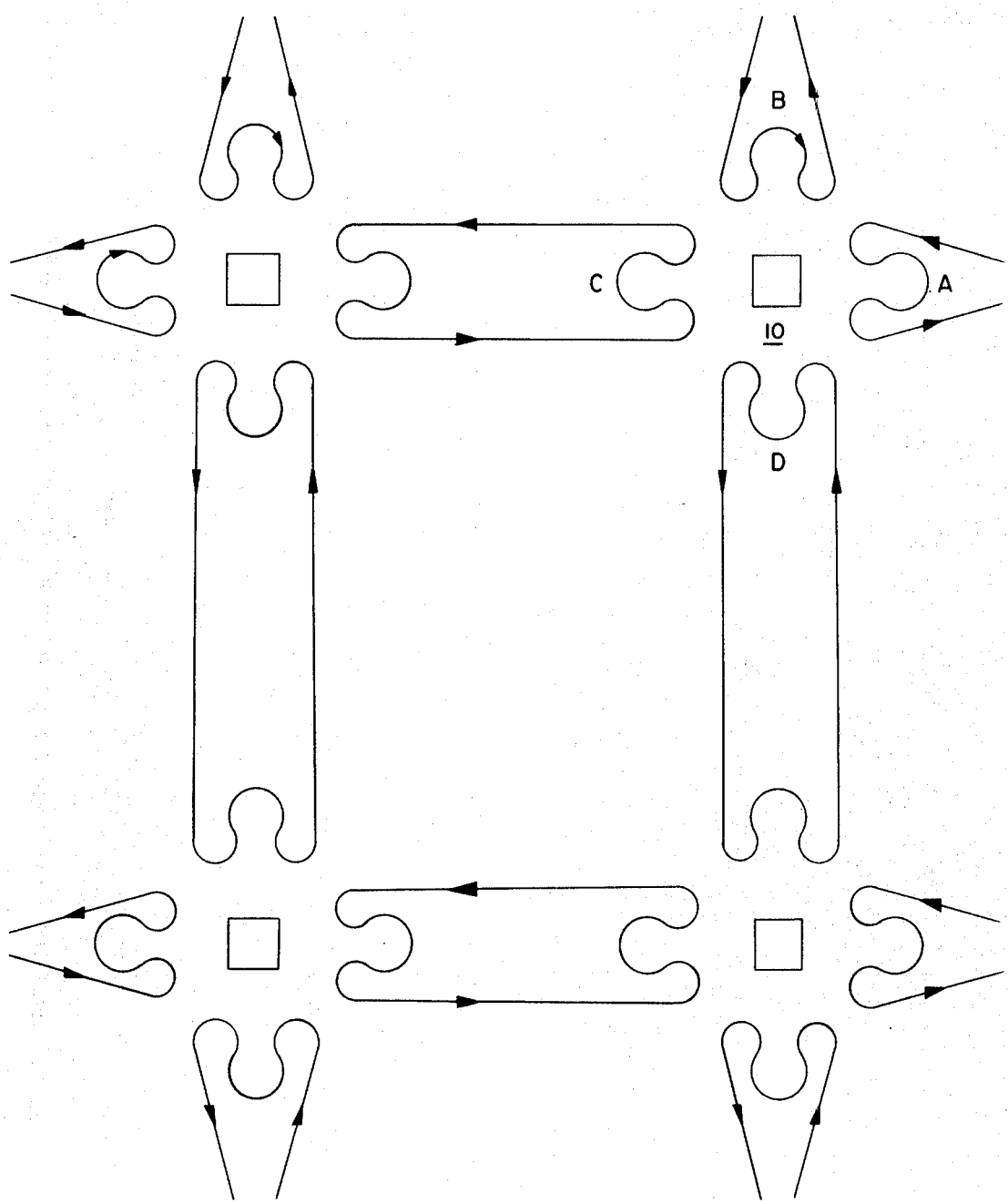
FIG. 8 is a schematic plan view of the closed loop system.

Referring now to FIG. 8, there is shown a closed loop system in which the four-terminal station 10 of FIG. 1 is incorporated. Each of the loops is designed to cover a particular area, irrespective of distance, to accomodate travel requirements from one pedestrian location to another. For example, loop A may connect a parking lot at an airport with the airport terminal. Loop D, on the other hand, may connect a remote location with the airport terminal, which may be designated station 10. Similarly, the other loops and stations can handle traffic for any particular needs in a transit situation, depending upon the requirements of the urban or rural area.

Thus it can be seen that the inventor has provided a simple, economically inexpensive, safe and efficient transit system that avoids the problems of present day transportation without adding to the pollution or chaos of our environment.

Therefore, it is contemplated that this invention is not to be limited except within the scope of the appended claims.

What is claimed is:

1. In a pneumatic transit system,
   a plurality of vehicles,
   tracking means for said vehicles,
   linear air motive means for moving said vehicles along said tracking means, pneumatic duct means associated with said tracking means, and piston means connected to each of said vehicles and movable within said duct means, whereby collision between vehicles is prevented by said piston means compressing air in said duct means when vehicles are in proximity to each other.

2. In a pneumatic transit system,
a plurality of carrying means,
tracking means for said carrying means,
power means for moving said carrying means along said tracking means,
pneumatic tube means associated with said tracking means, and piston means connected to each of said carrying means and movable within said tube means, whereby collision between said carrying means is prevented by said piston means compressing air in said tube means when said carrying means are in proximity to each other.

3. In a pneumatic transit system as defined in claim 1, wherein flexible pneumatic buffers are mounted on said vehicles for proximity engagement with at least one adjacent vehicle to minimize speed differentials therebetween.

4. In the system of claim 3 wherein said buffers comprise memory plastic material having a relatively small aperture therein to permit atmospheric pressure therein while restricting rapid leakage of air upon compression thereof.

5. In a pneumatic transit system as defined in claim 2, wherein flexible pneumatic buffers are mounted on said carrying means for proximity engagement with at least one adjacent carrying means to minimize speed differentials therebetween.

6. In the system of claim 5 wherein said buffers comprise memory plastic material having a relatively small aperture therein to permit atmospheric pressure therein while restricting rapid leakage of air upon compression thereof.

7. In the system of claim 1 wherein said piston means and said duct means include queing means associated therewith to guide selected ones of said vehicles to pre-selected stations.

8. In the system of claim 2 wherein said piston means and said tube means includes queing means associated therewith to guide selected ones of said carrying means to pre-selected stations.

9. In a transit system,
a plurality of carrying means,
tracking means for said carrying means,
power means for moving said carrying means along said tracking means,
pneumatic tube means associated with said tracking means, and piston means connected to each of said carrying means and movable within said tube means, whereby engagement between carrying means is prevented by said piston means compressing air in said tube means between adjacent carrying means in proximity to each other.

10. In the system of claim 9 wherein queing means associated with said piston means and said tube means effects guiding of selected ones of said carrying means to pre-selected stations.

* * * * *